United States Patent
Allen et al.

(10) Patent No.: US 11,503,096 B2
(45) Date of Patent: *Nov. 15, 2022

(54) SYSTEM AND METHOD FOR VERIFYING AND PROVIDING COMPENSATION FOR PARTICIPATION IN REAL-TIME STREAMING OF MULTIMEDIA OVER A DECENTRALIZED NETWORK

(71) Applicant: Infrared5, Inc., Jamaica Plain, MA (US)

(72) Inventors: Chris Allen, Jamaica Plain, MA (US); Davide Lucchi, Cerea (IT); Paul Gregoire, Jr., Henderson, NV (US)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,022

(22) Filed: Jun. 14, 2021

(65) Prior Publication Data

US 2021/0360049 A1 Nov. 18, 2021

Related U.S. Application Data

(60) Continuation of application No. 16/161,264, filed on Oct. 16, 2018, now Pat. No. 11,064,004, which is a (Continued)

(51) Int. Cl.
*H04L 65/65* (2022.01)
*H04L 65/80* (2022.01)
(Continued)

(52) U.S. Cl.
CPC ............ *H04L 65/65* (2022.05); *H04L 65/613* (2022.05); *H04L 65/75* (2022.05); *H04L 65/80* (2013.01); *H04L 67/56* (2022.05)

(58) Field of Classification Search
CPC . H04L 65/608; H04L 65/4092; H04L 65/601; H04L 65/80; H04L 67/28
See application file for complete search history.

(56) References Cited

U.S. PATENT DOCUMENTS

| | | | |
|---|---|---|---|
| 6,310,873 B1 | 10/2001 | Rainis et al. | |
| 7,809,646 B2 * | 10/2010 | Rose | G06Q 20/0855 705/51 |

(Continued)

FOREIGN PATENT DOCUMENTS

| | | |
|---|---|---|
| CN | 112292681 A | 1/2021 |
| CN | 112470156 A | 3/2021 |

(Continued)

OTHER PUBLICATIONS

"Tether: Fiat Currencies on the Bitcoin Blockchain", https://tether.to/wp-content/uploads/2016/06/TetherWhitePaper.pdf, last accessed May 21, 2019, 20 Pages.

(Continued)

*Primary Examiner* — Viet D Vu

(57) ABSTRACT

The present invention relates to systems and methods suitable for verifying and compensating nodes for streaming multimedia. In particular, the present invention relates to systems and methods that utilize a blockchain to verify and compensate devices for computational resources contributions when streaming multimedia over a decentralized network.

20 Claims, 5 Drawing Sheets

Related U.S. Application Data division of application No. 15/954,318, filed on Apr. 16, 2018, now Pat. No. 10,979,476.

(51) Int. Cl.
*H04L 65/75* (2022.01)
*H04L 65/613* (2022.01)
*H04L 67/56* (2022.01)

(56) References Cited

U.S. PATENT DOCUMENTS

| | | | |
|---|---|---|---|
| 7,937,362 B1 | 5/2011 | Lian et al. | |
| 8,699,336 B2 | 4/2014 | Huo | |
| 10,848,553 B2 | 11/2020 | Allen et al. | |
| 10,979,476 B2 | 4/2021 | Allen et al. | |
| 11,064,004 B2 | 7/2021 | Allen et al. | |
| 2002/0059117 A1 | 5/2002 | Yoch et al. | |
| 2008/0065771 A1* | 3/2008 | Marvit | G06Q 20/02 709/226 |
| 2008/0082507 A1 | 4/2008 | Tarantino et al. | |
| 2008/0133767 A1 | 6/2008 | Birrer et al. | |
| 2011/0087915 A1 | 4/2011 | Zhang et al. | |
| 2013/0191518 A1 | 7/2013 | Narayanan et al. | |
| 2014/0098850 A1 | 4/2014 | Wolfram et al. | |
| 2015/0002619 A1 | 1/2015 | Johnston et al. | |
| 2015/0082021 A1 | 3/2015 | Mandyam et al. | |
| 2015/0170112 A1 | 6/2015 | Decastro | |
| 2015/0235282 A1 | 8/2015 | Kamath | |
| 2016/0065636 A1 | 3/2016 | Cheung et al. | |
| 2016/0094649 A1 | 3/2016 | Dornquast et al. | |
| 2016/0094659 A1 | 3/2016 | Shimomoto | |
| 2016/0269365 A1 | 9/2016 | Reddy et al. | |
| 2017/0206523 A1 | 7/2017 | Goeringer et al. | |
| 2017/0277909 A1 | 9/2017 | Kraemer et al. | |
| 2017/0279774 A1 | 9/2017 | Booz et al. | |
| 2018/0211043 A1 | 7/2018 | Husain | |
| 2018/0248880 A1 | 8/2018 | Sardesai et al. | |
| 2018/0268382 A1 | 9/2018 | Wasserman | |
| 2019/0089760 A1 | 3/2019 | Zhang et al. | |
| 2019/0296915 A1* | 9/2019 | Lancashire | G06Q 20/3825 |
| 2019/0320004 A1 | 10/2019 | Allen et al. | |
| 2019/0320006 A1 | 10/2019 | Allen et al. | |
| 2019/0320014 A1 | 10/2019 | Allen et al. | |
| 2021/0058456 A1 | 2/2021 | Chris et al. | |

FOREIGN PATENT DOCUMENTS

| | | |
|---|---|---|
| EP | 3264722 A1 | 1/2018 |
| EP | 3782068 A1 | 2/2021 |
| EP | 3782069 A1 | 2/2021 |
| WO | 2019204158 A1 | 10/2019 |
| WO | 2019204159 A1 | 10/2019 |

OTHER PUBLICATIONS

Al-Naji, et al., "Basis: A Price-Stable Cryptocurrency with an Algorithmic Central Bank", Version 0.99.7, URL: www.basis.io, Jun. 20, 2017, 27 Pages.

Amazon Web Services, Inc., "Amazon Web Services—Simple Monthly Calculator", hllps://calculator.s3.amazonaws.com/index.html, last accessed May 21, 2019, 24 Pages.

Andreasson, Niklas, et al., "Rymd Distributed Encrypted Peer-To-Peer Storage Bachelor's thesis in Computer Science", Bachelor's thesis in Computer Science, URL: https://odr.chalmers.se/bitstream/20.500.12380/203144/1/203144.pdf, Jan. 1, 2014, 63 Pages.

Bordo, et al., "Central Bank Digital Currency and the Future of Monetary Policy", Retrieved from the Internet on Feb. 10, 2020, Aug. 31, 2017, pp. 1-32.

Brent, et al., "Reserve Stabilization Protocol", URL: https://uploads-ssl.webflow.com/5c0649fb67dd7b3627d59953/5c092732e4eab1547fa9bd0c_whitepaper.pdf., Nov. 30, 2018, 29 Pages.

Brooks, et al., "HAVVEN, A Decentralized Payment Network and Stablecoin v0.8", Jun. 11, 2018, 31 Pages.

Doran, et al., "Emergent Economies for Pole Playing Games", Technical Report LARC—Mar. 2013, Laboratory for Recreational Computing Department Science & Engineering University of North Texas, Jun. 23, 2010, 24 Pages.

Dorri, et al., "LSB: A Lightweight Scalable BlockChain for IoT Security and Privacy", Dec. 8, 2017, 17 Pages.

European Patent Office, "Extended European Search Report", European Application No. 19789015.5, dated Aug. 16, 2021, 13 Pages.

European Patent Office, "Extended European Search Report Received", European Applicaton No. 19788671.6, dated Mar. 3, 2022, 16 Pages.

GITHUB, Inc., "https://github.com/larsiusprime/bazaarBot", last accessed May 21, 2019.

Lipton, et al., "Digital trade coin: towards a more stable digital currency", URL: https://royalsocietypublishing.org/doi/pdf/10.1098/rsos.180155, Jun. 18, 2018, 15 Pages.

Silva, et al., "Cryptocurrency Compensation: A Primer on Token-Based Awards", Harvard Law School Forum on Corporate Governance, May 19, 2018.

U.S. Patent and Trademark Office, "Final Office Action Received", U.S. Appl. No. 15/954,318, dated Feb. 13, 2019, 8 Pages.

U.S. Patent and Trademark Office, "Final Office Action Received", U.S. Appl. No. 15/954,318, dated Nov. 1, 2019, 15 Pages.

U.S. Patent and Trademark Office, "Final Office Action Received", U.S. Appl. No. 16/161,264, dated Nov. 19, 2019, 10 Pages.

U.S. Patent and Trademark Office, "International Search Report and Written Opinion Received", International Application No. PCT/US2019/027304, dated Aug. 15, 2019, 14 Pages.

U.S. Patent and Trademark Office, "International Search Report and Written Opinion Received", International Application No. PCT/US2019/027300, dated Aug. 26, 2019, 13 Pages.

U.S. Patent and Trademark Office, "International Search Report and Written Opinion Received", International Application No. PCT/US2019/067767, dated Mar. 2, 2020, 13 pages.

U.S. Patent and Trademark Office, "Non Final Office Action Received", U.S. Appl. No. 16/161,264, dated Aug. 9, 2019, 8 Pages.

U.S. Patent and Trademark Office, "Non Final Office Action Received", U.S. Appl. No. 15/954,318, dated Jun. 2, 2020, 8 Pages.

U.S. Patent and Trademark Office, "Non Final Office Action Received", U.S. Appl. No. 15/954,318, dated Jun. 14, 2019, 7 Pages.

U.S. Patent and Trademark Office, "Non Final Office Action Received", U.S. Appl. No. 15/954,318, dated Oct. 23, 2018, 7 Pages.

U.S. Patent and Trademark Office, "Non Final Office Action Received", U.S. Appl. No. 16/161,264, dated Sep. 21, 2020, 11 Pages.

U.S. Patent and Trademark Office, "Non-Final Office Action Received", U.S. Appl. No. 17/092,947, 31 Pages.

U.S. Patent and Trademark Office, "Notice of Allowance Received", U.S. Appl. No. 15/954,318, dated Dec. 11, 2020, pp. 5.

U.S. Patent and Trademark Office, "Notice of Allowance Received", U.S. Appl. No. 15/954,473, dated Jul. 24, 2020, 7 Pages.

U.S. Patent and Trademark Office, "Notice of Allowance Received", U.S. Appl. No. 16/161,264, dated Mar. 15, 2021, 5 Pages.

WIPO, "International Preliminary Report on Patentability", International Application No. PCT/US2019/027300, dated Oct. 29, 2020, 10 Pages.

WIPO, "International Preliminary Report on Patentability", International Application No. PCT/US2019/027304, dated Oct. 29, 2020, 11 Pages.

\* cited by examiner

SYSTEM AND METHOD FOR VERIFYING AND PROVIDING COMPENSATION FOR PARTICIPATION IN REAL-TIME STREAMING OF MULTIMEDIA OVER A DECENTRALIZED NETWORK

CROSS REFERENCE TO RELATED APPLICATION(S)

This application is a continuation application of U.S. patent application Ser. No. 16/161,264 filed Oct. 16, 2018, now U.S. Pat. No. 11,064,004, issued Jul. 13, 2021, which is a divisional patent application of U.S. patent application Ser. No. 15/954,318, filed on Apr. 16, 2018, now U.S. Pat. No. 10,979,476, issued Apr. 13, 2021, the entirety of which is hereby incorporated herein for all purposes.

FIELD OF THE INVENTION

The present invention relates to systems and methods suitable for verifying and compensating nodes for streaming multimedia. In particular, the present invention relates to systems and methods that utilize a blockchain to verify and compensate devices for computational resources contributions when streaming multimedia over a decentralized network.

BACKGROUND

Generally, the advent of the Internet and increased access to computer networks providing increased network bandwidth has facilitated the ability to stream audio and video content to end users. Live video streaming is a fast-growing market. In 2016, 81% of internet and mobile audiences watched more live videos than in 2015. Video streaming accounts for over two-thirds for all internet traffic, and it is expected to become 82% by 2020. Live streaming offers opportunities for content that traditionally required people to attend a physical event. Currently 45% of live video audiences would pay for live, exclusive, on-demand video from a favorite team, speaker, or performer. Video quality is considered the most important factor for 67% of the viewers, and that implies high resolution video streams with low latency.

Live video streaming creates much greater engagement, viewers will spend eight times longer watching live video than on-demand-video. This translates 42.8 minutes for live video versus only 5.1 minutes for on-demand.

The live streaming market is estimated to grow from USD 30.29 Billion in 2016 to USD 70.05 Billion by 2021, with an expected CAGR (Compound Annual Growth Rate) of 18.3% over the next 5 years. Platforms such as Facebook Live have seen viewing time grow by four times over 2016, and live video comprises 20% of their video content. Newcomers such as HQ Trivia have seen even faster growth over a six-month period.

From January 2016 to June 2016 the top 500 media publishers that streamed live video on their websites and social media platforms increased from 10% to 50%. 53% of U.S. internet users aged 13-17 watch live streaming videos on social media as of November 2016. In China, the numbers are even higher with 83% of millennials and nearly half of their total online population using live streaming services.

Fueled by consumer demand for live interactive video experiences, more and more companies are learning just how expensive it is to run these streams. By far the greatest expense in low latency video streaming is bandwidth. Conventional cloud based services provide solutions that are easy to use and scale as the demand rises, but those services can be expensive when pricing per gigabit.

SUMMARY

There is a need for improvements for incentivizing end users to participate in streaming multimedia over a decentralized network. Additionally, there is a need for improvements to reliably verify resource contributions by end user devices participating in a decentralized network. The present invention provides, in various embodiments, solutions to address this need, in addition to having other desirable characteristics.

In accordance with example embodiments of the present invention, a system providing a decentralized network for real-time streaming and compensating nodes for participation within the network is provided. The system includes a first device configured to provide a stream to a second device and provide compensation for computation resources provided by at least one origin node device and at least one edge node device delivering the stream, the at least one origin node device configured to establish a connection with the first device for forwarding the stream; and the at least one edge node device. The at least one edge node device is configured to establish a connection with the second device, receive the stream from the at least one origin device, and provide the stream to the second device. Operation of the at least one origin node and the at least one edge node are managed and tracked over blockchain.

In accordance with aspects of the present invention, the method further includes at least one relay node device configured to relay the stream between the at least one origin node device and the at least one edge node device. The at least one edge node device, the at least one relay node device, and the at least one proxy node can be compensated for contributing computational resources to the decentralized network. The first device can provide the compensation and can verify a quantity of the computational resources provided by the at least one origin node and the at least one edge node prior to providing the compensation. The system can further include at least one proxy node device acting as a Session Traversal Utilities for NAT (STUN) server or Traversal for using Relays around NAT (TURN) server. The STUN server can be compensated on a per use basis and the TURN server can be compensated on a computational resource contribution basis. The computational resources can be at least one of processing power, storage capacity, bandwidth utilized. The compensation can be a token based currency.

In accordance with example embodiments of the present invention, a method for providing real-time streaming over a decentralized network and compensating nodes for participation within the decentralized network is provided. The method includes establishing, by a first device, a connection to at least one origin node device, providing, by the first device, a stream to the at least one origin node device, and forwarding, by the stream to at least one edge node device. The method also includes receiving, by the at least one edge node device, the stream from the at least one origin device, providing, by the at least one edge node device, the stream to a second device, and providing, by the first device, compensation to the at least one origin node device and the at least one edge node device for computational resources contributed to delivering the stream to the second device. Operation of the at least one origin node and the at least one edge node are managed and tracked over blockchain.

In accordance with aspects of the present invention, the method further includes relaying, by at least one relay node device, the stream between the at least one origin node device and the at least one edge node device. The at least one relay node device can be compensated for contributing computational resources to the stream. The first device provides the compensation and can verify a quantity of the computational resources provided by the at least one origin node and the at least one edge node prior to providing the compensation. The at least one edge node device, the at least one relay node device, and the at least one proxy node can set a price for their computation resources for contributions within the decentralized network. The method can further include allocating at least one proxy node device acting as a Session Traversal Utilities for NAT (STUN) server or Traversal for using Relays around NAT (TURN) server. The STUN server can be compensated on a per use basis and the TURN server can be compensated on a computational resource contribution basis. The computational resources are at least one of processing power, storage capacity, bandwidth utilized. The compensation can be a token based currency.

In accordance with example embodiments of the present invention, a method for receiving compensation for participating in real-time streaming over a decentralized network is provided. The method includes calculating, by the node, how much bandwidth is delivered for a stream, retrieving, by the node, a list of neighboring nodes receiving the stream, and requesting, by the node, a signed message for bandwidth metrics experienced by each of the neighbor nodes. The method also includes receiving, from the neighbor nodes, signed messages with bandwidth metrics for the node, transmitting, by the node, the calculated bandwidth and the signed messages to a broadcaster of the stream, and receiving, from the broadcaster, compensation for the bandwidth delivered for the stream by the node.

In accordance with aspects of the present invention, the node is one of an edge node device, a relay node device, and a proxy node.

In accordance with example embodiments of the present invention, a method for verifying proof of bandwidth for a node participating in real-time streaming over a decentralized network is provided. The method includes receiving, from the node, a proof of bandwidth message having a calculated bandwidth delivered for a stream by the node and a message signed by neighbor nodes of the node including bandwidth metrics for the node observed by the neighbor nodes for the stream, and verifying, by a broadcaster, identities of the node and the neighbor nodes as participants within the stream and verifying, by the broadcaster, signatures of the neighbor nodes in the message. The method also includes comparing, by the broadcaster, the calculated bandwidth delivered by the node and the bandwidth metrics in the message signed by the neighbor nodes, determining, by the broadcaster, a valid comparison, and transmitting, by the broadcaster, compensation for the calculated bandwidth to the node.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
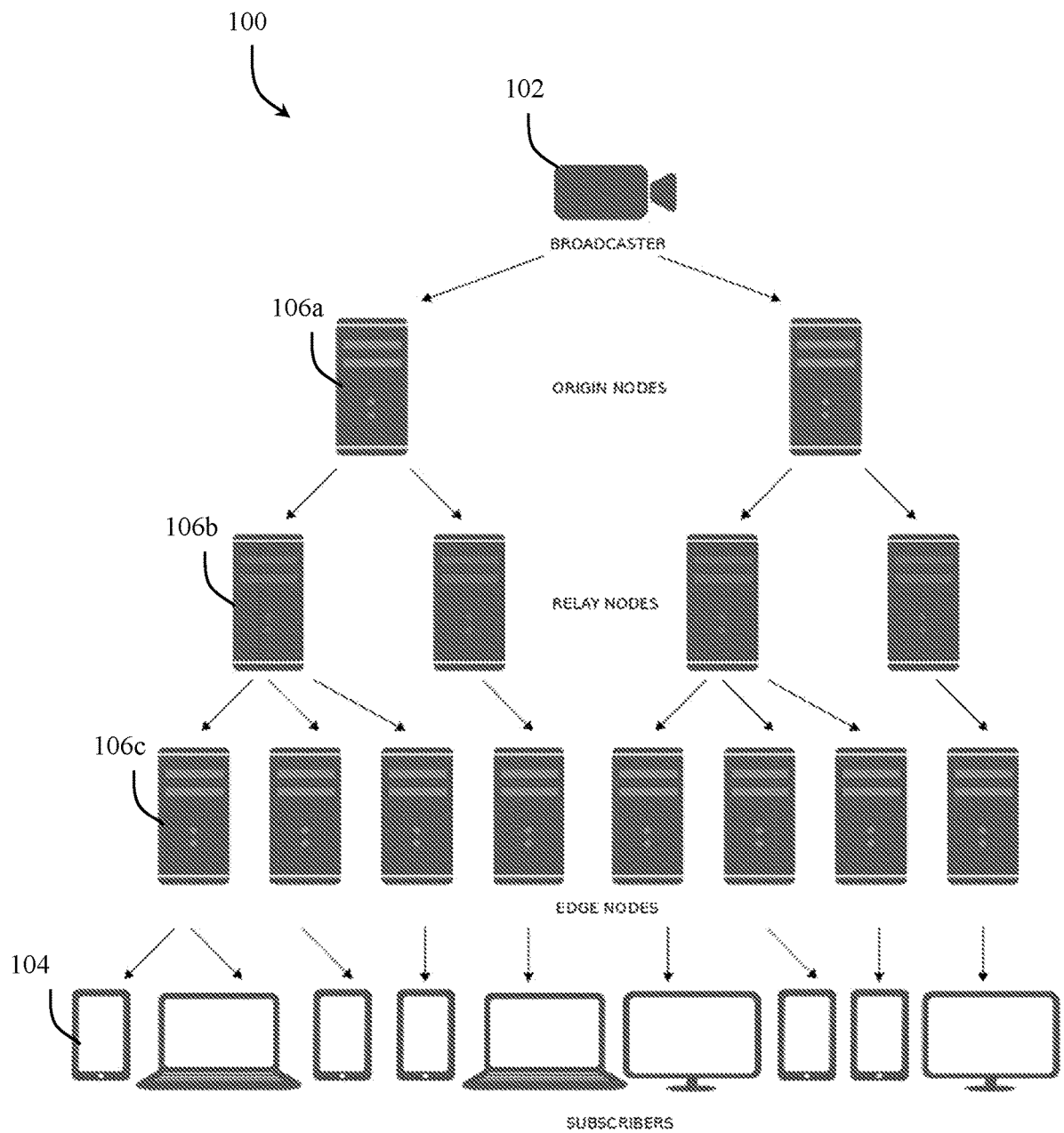
FIG. 1 is an exemplary configuration for a decentralized streaming network, in accordance with the present invention.

An illustrative embodiment of the present invention relates to provide compensation for participation within a decentralized system for real-time multimedia streaming. The decentralized network is configured using and the compensation is tracked and verified utilizing blockchain technology. To implement the decentralized network, the present invention exploits available resources provided by individual users/computing devices, also referred as node owners, to deliver the streams through a decentralized network. In particular, the present invention is configured to exploit user devices and cloud (and/or bare metal hardware) resources that are available in excess. More specifically, individual users and could resource that elect to run the software of the present invention become one of the nodes in the peer-to-peer network and can start participating to route streams between a broadcaster and a subscriber.

As used herein, a broadcaster is defined as any user and user device that wants to stream multimedia through the network and a subscriber is any user and user device that wants to watch a stream. As would be appreciated by one skilled in the art, reference to the broadcaster and the subscriber as discussed in relation to the present invention can include both the computing device implementing the processes of the present invention and the user(s) who owns and/or operates the computing device. The present invention provides benefits to the broadcaster providing the stream, the nodes hosting the stream, and the end users receiving the stream.

In certain implementations, end user nodes can be compensated for participation within the decentralized network and contributing computational resources to streaming multimedia to subscriber user devices from broadcaster devices. Computational contributions can include any combination of processing power, storage capacity, bandwidth utilized, etc. and are monitored, verified and compensated based on information obtained through the blockchain. The present invention provides benefits to the broadcaster providing the stream, the nodes hosting the stream, and the end users receiving the stream. In particular, the broadcaster will sustain smaller expenses for computational resources (e.g., bandwidth) while node owners will earn compensation based on the resources and quality of service that their node provides to the network.

The systems and methods of the present invention introduces a new token compensation that can be used to acquire access to paid video streams. The compensation can also be earned by being part of the network and delivering video streams between broadcasters and subscribers. The innovative compensation mechanism includes a mechanism called proof of bandwidth, and it compensates a node proportionally to the resources it is providing to the network. The network allows both broadcasters and node hosts to set their price to create a competitive market to keep costs low. This method of compensation and paying for the computational resources to deliver data (e.g., multimedia streams) opens a much cheaper alternative to traditional centralized streaming services. In addition, the network creates an alternative for cryptocurrency miners. Instead of the energy expensive proof of work calculations, blockchain miners can now leverage their unused resources by hosting nodes to earn compensation.

FIGS. 1 through 5, wherein like parts are designated by like reference numerals throughout, illustrate an example embodiment or embodiments of improved operation for verifying and compensating computational contributions for streaming audio and video over the Internet, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an exemplary system and network for implementing an embodiment of the present invention. In particular, FIG. 1 depicts a distributed peer-to-peer network 100 configured to stream multimedia (e.g., audio or video) from a broadcaster 102 (e.g., service provider) to end users 104 (e.g., subscribers) over a series of connected nodes 106. In implementation, the behavior of each node 106 within the network 100 is managed by the process and protocol implemented by the present invention (e.g., via blockchain). In accordance with an example embodiment, the nodes 106 can be assigned one of four different roles within the network 100. The roles include origin nodes 106a, relay nodes 106b, edge nodes 106c, and proxy nodes 106d.

The origin nodes 106a are the ingest nodes 106 and can be configured to receive the multimedia stream from a broadcaster 104 and distribute it to the relay nodes 106b/edge nodes 106c. In implementation, the origin nodes 106a can be nodes 106 owned and controlled by the broadcaster 102 or nodes 106 chosen randomly from a pool of nodes 106 available in the peer-to-peer network 100. The relay nodes 106b can be configured to forward the multimedia stream between origin nodes 106a and edge nodes 106c. In implementation, each relay node 106b may be connected to tens or hundreds of edge nodes 106c.

The edge nodes 106c can be the nodes 106 that are configured to deliver the multimedia stream to the subscriber 104 end users and each of the edge nodes 106c can serve up to a few thousand subscribers. As would be appreciated by one skilled in the art, this number depends on the hardware capabilities of the nodes 106 in the network 100 and the quality of the streams provided by the broadcaster 102. In general, the higher the quality of the streams, then the less capacity per node 106.

Figure 2:
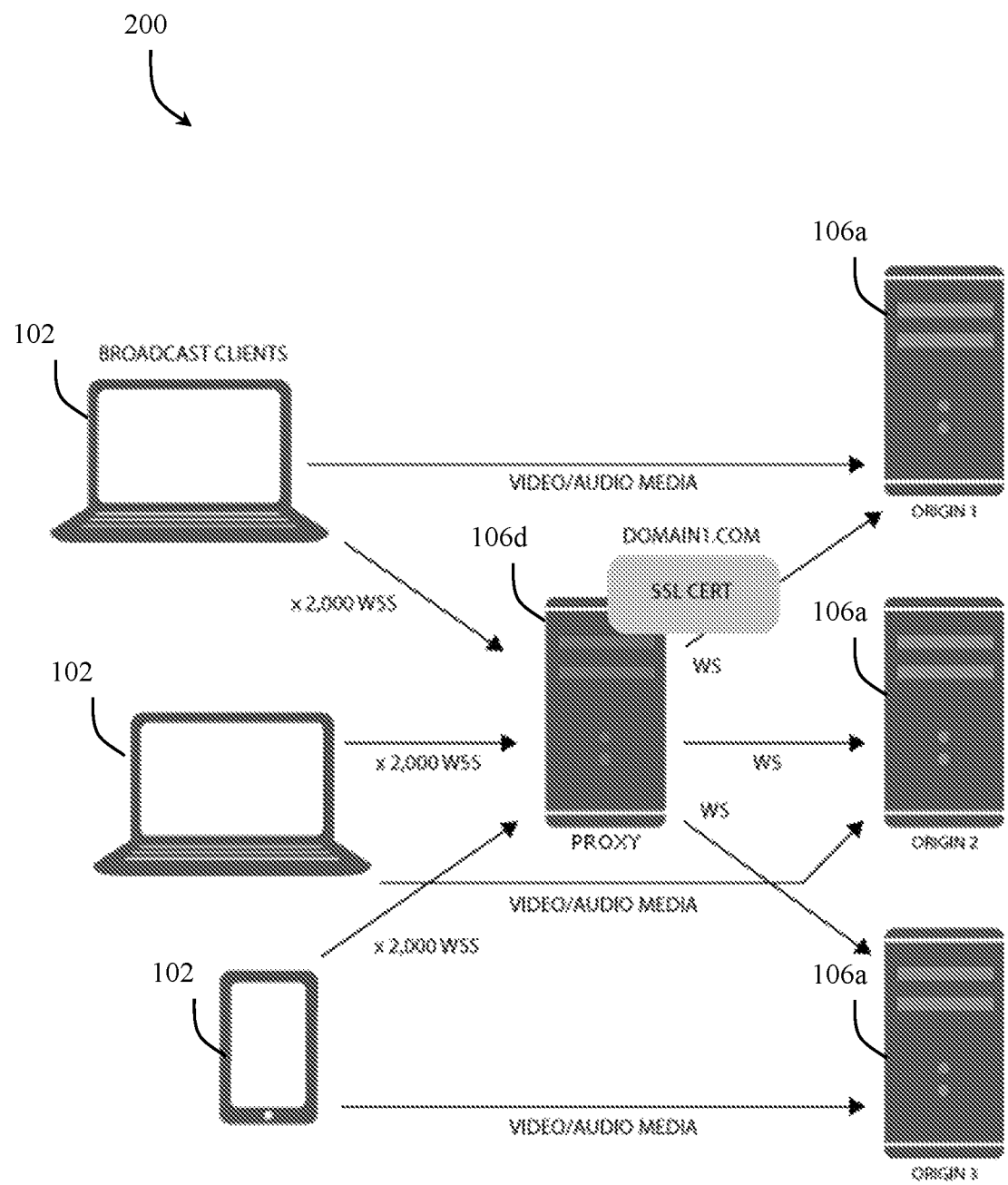
FIG. 2 is exemplary configuration for implementing a proxy node within a decentralized streaming network, in accordance with the present invention.

In accordance with an example embodiment of the present invention, proxy nodes 106d can be optionally required depending on the communication protocol being implemented over the network 100. For example, Web Real-Time Communication (WebRTC) and the HTML5 Cross-Origin Resource Sharing (CORS) standard mandate that Hypertext Markup Language (HTML) pages be delivered via Hypertext Transfer Protocol Secure (HTTPS) to the browser for the user to access the camera and microphone, and thus require implementation of a proxy (e.g., proxy node) to pass a Secure Sockets Layer (SSL) certificate. The SSL certificate is needed when subscribing over WebRTC, which is served via a secure page delivered over HTTPS. Additionally, proxy nodes 106d are configured to provide a domain address to facilitate the exchange of SSL certificates. FIG. 2 depicts an exemplary configuration for implementing a proxy node 106d within the network 100. Implementation and utilization of the network 100 and the various nodes 106 and their respective roles are discussed in greater detail with respect to co-pending U.S. application Ser. No. 15/954,473, incorporated herein by reference.

In an example embodiment, similar to proxy nodes 106d, a Session Traversal Utilities for NAT (STUN) and Traversal for using Relays around NAT (TURN) servers are fundamental to be able to set-up WebRTC connections (or connections under similar protocols) in accordance with the present invention. The STUN and TURN servers can be implemented by nodes 106 registered in the network 100 and are elected randomly by a subscriber 104 or broadcaster 102 that needs to set-up a WebRTC connection (or connections under similar protocols). Therefore, when a new node joins the network 100, it publishes on the blockchain a transaction with all of its details that will also state if the node can be used as a STUN and or TURN server. In ideal circumstances, the same node 106 will act as the proxy node 106d and have STUN and TURN server capabilities.

In accordance with an example embodiment, operation of the broadcasters 102, nodes 106, and subscribers 104 can be controlled by a blockchain. The blockchain can be used to setup connections between different devices (e.g., nodes) and can publish data that should be available to all nodes 106 participating in the network 100. For example, information about the past and upcoming multimedia streams can be shared across all of the nodes 106 in the network 101 and information for all of the nodes can also be shared over the blockchain for managing connections. As would be appreciated by one skilled in the art, the present invention can utilize any blockchain platform that is fast executing, allows for a large number of transactions per second and supports the ability to run smart contracts and execute code. For example, the present invention can utilize Ethereum blockchain platform.

Due to the reliance on devices volunteering resources to create the network 100 of the present invention, there is a need to incentivize nodes 106 to participate as origin nodes 106a, relay nodes 106b, edge nodes 106c, proxy nodes 106d, and STUN/TURN servers. The blockchain can be used to send payments or compensations to the devices that volunteer as nodes and that provide computational resources, such as bandwidth. In accordance with an example embodiment, the network 100 can incentivize participation by offering cryptocurrency tokens to devices (e.g., node) that volunteer to contribute computational resources (e.g., processing power, memory, bandwidth, etc.) for operation of the network 100 (e.g., facilitate streaming). The compensation can be set by the broadcaster 102 and publicized to the nodes 106 throughout the network 100 (e.g., via the blockchain). For example, a broadcaster 102 can publish a smart contract on the blockchain with all the details for a specific stream including the price (if a paid stream), the start and end time of the stream, any geographical limitations/restrictions for the stream, the compensation amount that the broadcaster 102 is willing to pay the other nodes 106, and an address that can be used to contact the broadcaster 102 (e.g., exchange messages using Whisper).

Additionally, the smart contract can provide functions to offer a digital rights management (DRM) key to subscribers 104 if the stream is paid an/or the broadcaster 102 does not want to set up its own DRM key distribution system. Once the smart contract is published, subscribers 104 can interact with the network 100 and start buying DRM keys. The utilization of DRM keys, in accordance with the present invention, is discussed in greater detail with respect to co-pending U.S. application Ser. No. 15/954,473, incorporated herein by reference.

In accordance with an example embodiment, the network 100 does not rely on the blockchain for all of its operation. Implementing all operations on the blockchain could make the system too slow, and therefore many operations can be moved off-chain. The off-chain operations can include but are not limited to the storage of the application data, algorithms used to compensate nodes (e.g., the proof of bandwidth algorithm), and other computations necessary to run the protocols for managing the nodes 106. The present invention can implement off chain operations to improve the overall speed and function of the distributed network 100.

In operation, nodes 106 join the network 100 and become available to participate in streaming multimedia content for broadcasters 102/subscribers 104. The nodes 106 are assigned roles within the network 100 and the blockchain is utilized to publish and manage the roles. The registration of nodes, election or roles for nodes, and management of nodes is discussed in greater detail with respect to co-pending U.S. application Ser. No. 15/954,473, incorporated herein by reference. In accordance with an example embodiment, the protocol of the present invention can prevent a node 106 from occupying two different roles for the same stream. For example, a node 106 cannot be configured to act as an origin node 106a and an edge node 106c for the same stream. A stream can be defined as an instance of a particular multimedia provided from a particular broadcaster 102 to a particular subscriber 104 end user. Separating roles from individual nodes is necessary to make it difficult for a node to spoof the amount of bandwidth it is providing to the network. If a node could occupy more than one role within a stream, the node would be able to earn more compensation than it should. In one example embodiment, the network 100 can exploit the neighbors of a node to verify the bandwidth of a certain node, so if all these nodes where controlled by the same user, which could be the case if a node could have multiple roles in the same stream, then it would be easy to spoof the bandwidth measurements and thus earn more compensation.

In accordance with an example embodiment, end users who own devices participating as nodes 106 can be compensated for the role they provide within a stream and the computational resources that are dedicated to that stream. For example, the origin nodes 106a, relay nodes 106b, and edge nodes 106c can be compensated for the bandwidth provided when providing a stream from a broadcaster 102 to a subscriber(s) 104. The compensation per bandwidth can be dictated by a combination of the broadcaster 102 and the nodes 106 themselves. Additionally, nodes acting as proxy nodes 106c and/or STUN/TURN servers can be compensated on a per use model.

In accordance with an example embodiment, upon joining the network 100, each node 106 can set a token price for the computational resources (e.g., Gb/s bandwidth) provided to a broadcaster 102 when streaming. In this way, nodes 106 can establish how performant and competitive they want to be compared to other nodes 106 within the network 100. Additionally, node set bandwidth prices allows a broadcaster 102 to stream only through nodes 106 that guarantee it a cap on the max price per resource (e.g., Gb/s bandwidth used). In this way, nodes 106 have a guarantee that they will be able to earn a particular amount of compensation when contributing computational resources to streams and broadcasters 102 can adhere to a budget when electing nodes.

In an example embodiment, broadcasters 102 can choose a maximum price for computational resources (e.g., Gb/s bandwidth) that they are willing to pay based on the performance they want to achieve. This maximum price can be dictated in the smart contract published on the blockchain by the broadcaster 102 and can also influence which nodes 106 are selected for a particular stream. Additionally, both broadcasters 102 and nodes 106 can change the compensation prices on the fly through a smart contract function. If a node 106 or broadcaster 102 changes its price, however, the new price will be valid only for the new connections, while the old price will still apply for the already existing connections. This avoids malicious behavior, for example, such as having nodes attract a broadcaster with a low price and then increase it once they have more bandwidth for this stream.

In accordance with an example embodiment, the blockchain can be utilized to track and verify participation of all the nodes 106 and the computational contributions provided by the nodes 106 to streams over the network 100. The tracking and verification is provided as a layer of incentive, assurance, and enforcement for reliable operation of streams over the network 100. For example, verified compensation is provided to honest nodes (obeying the rules of the system and accurately reporting information) while docked compensation and penalization is provided to malicious nodes (nodes attempting to spoof bandwidth, cause attacks, improperly leaving the network will providing a stream, etc.) within the network 100. In an example embodiment, a proof of bandwidth mechanism can be used by a node 106 to validate the bandwidth it is delivering for a stream along with its packet loss. The proof of bandwidth process is initiated by a node and it exploits all of its neighbors to provide reliable verification through the blockchain. Once the process is done, the node will receive a signed proof of bandwidth message that can be sent to the broadcaster 102 for compensation. Thereafter, the broadcaster 102 will validate the proof and compensate the node. As would be appreciated by one skilled in the art, the proofing is not intended to be limited to bandwidth and can be adjusted for any combination of computational resources known in the art without departing from the scope of the present invention.

Figure 3:
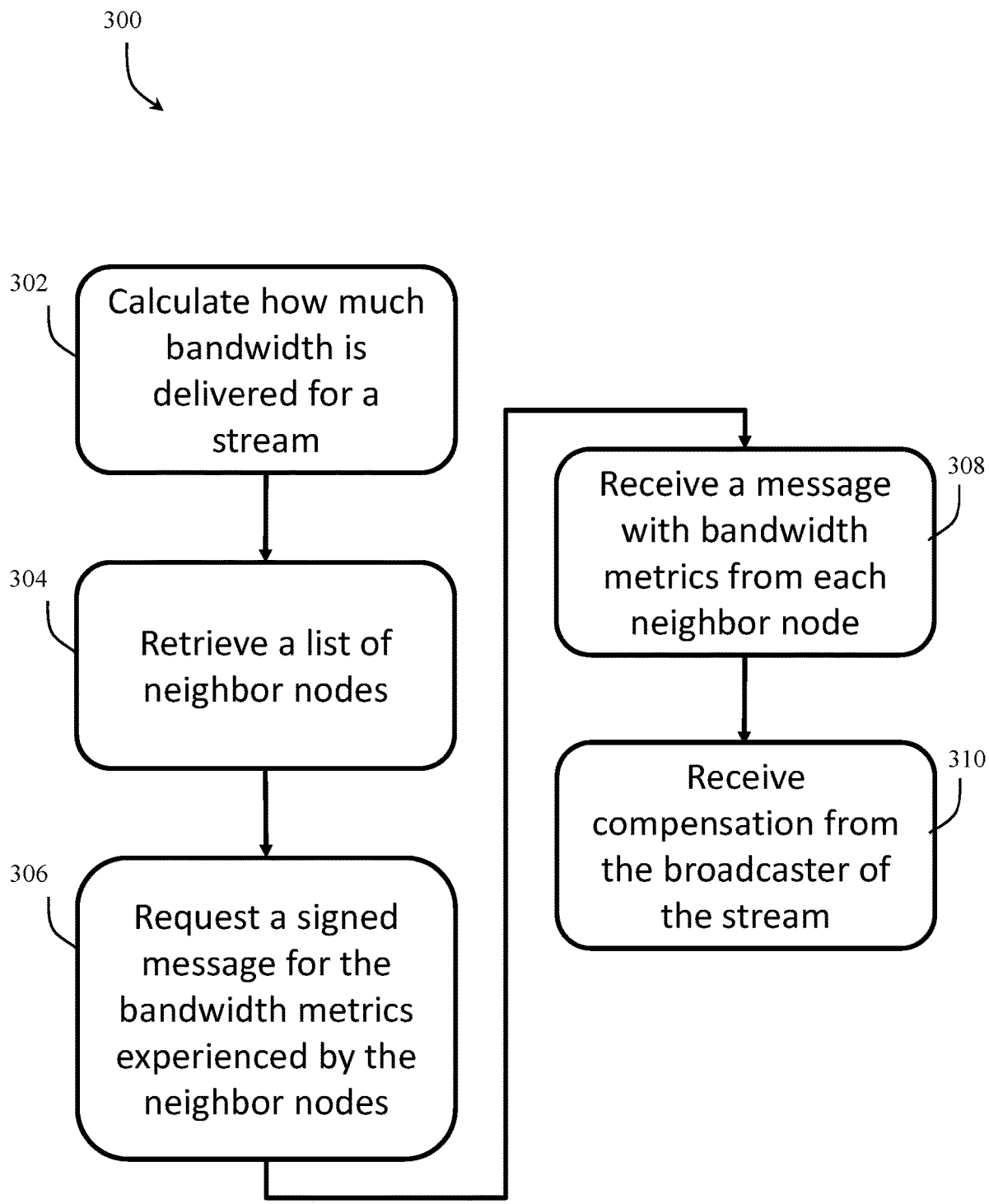
FIG. 3 is an exemplary process for a node establishing proof of bandwidth, in accordance with the present invention.

FIG. 3 provides an exemplary example of the proof of bandwidth process 300 implemented by a node 106. At step 302 the node calculates how much bandwidth it is delivering for a certain stream to neighboring nodes. At step 304 the node retrieves, from its local data storage, a list of neighbor nodes receiving the stream from the node. At step 306 the node communicates with the neighbor nodes (e.g., via Whisper) and asks them to generate a signed message that states how much bandwidth they are receiving from the node for a particular stream along with how much packet loss is incurred (e.g., bandwidth metrics). In response to receiving the request, during step 306, the neighbor nodes use their own local database to verify if the node that made the request is in fact one of their neighbor nodes. Upon verification, the neighbor node will generate a message that states the bandwidth and packet loss value experienced at the neighbor from the requesting node and generate a digital signature that proves the message was generated by the neighbor node itself. At step 308 the requesting node receives a message from each neighbor and forwards them to the broadcaster of the stream (e.g., through Whisper). At step 310 the node will receive a compensation from the broadcaster for the amount of bandwidth provided, if the broadcaster verification succeeds, as discussed with respect to FIG. 4. The transaction with the compensation can specify the number of tokens, the bandwidth in Gb/s, for which the node is being compensated and the packet loss reported by its neighbors.

Figure 4:
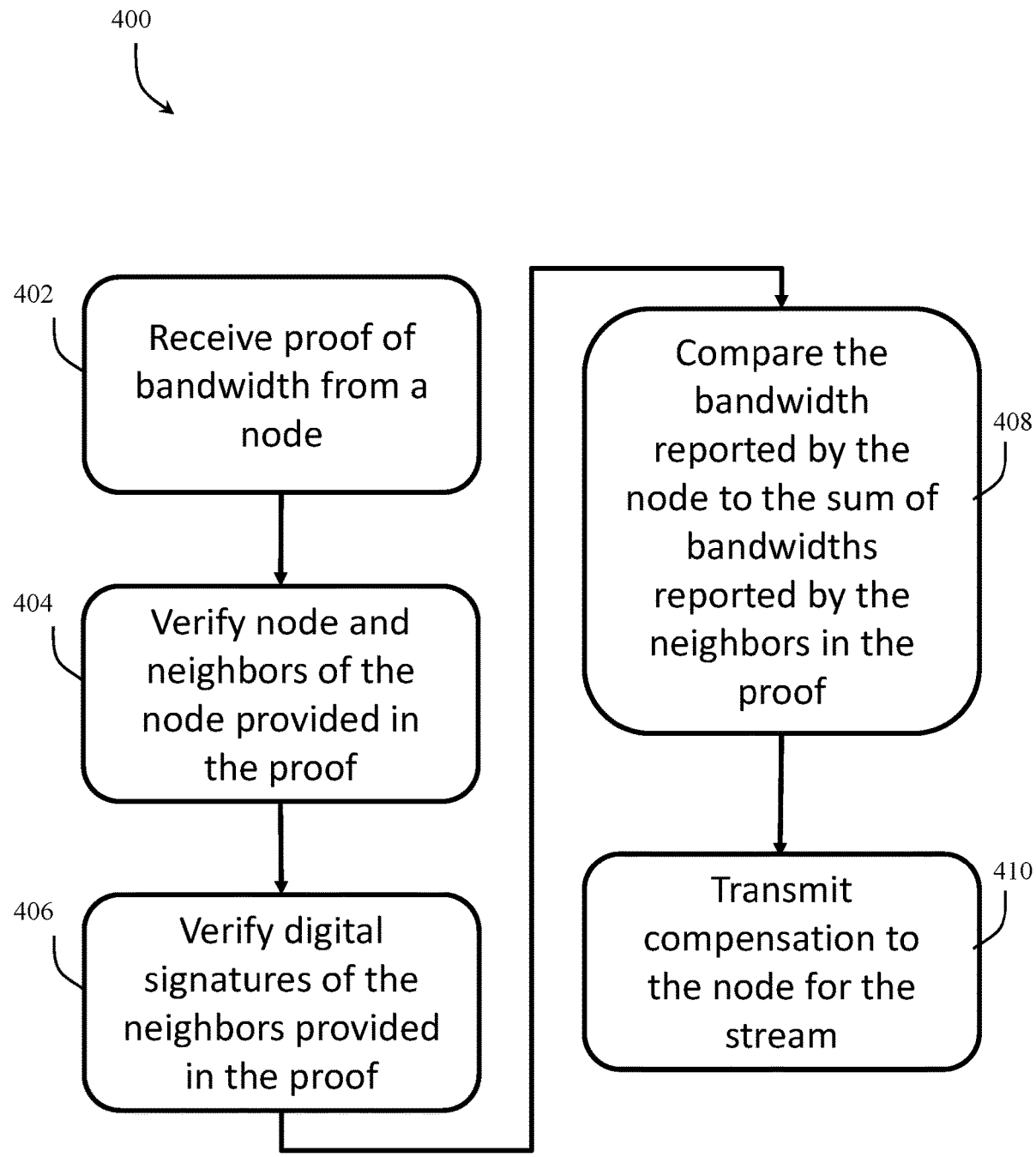
FIG. 4 is an exemplary process for a broadcaster verifying proof of bandwidth, in accordance with the present invention.

FIG. 4 provides an exemplary example of the proof of bandwidth process 300 implemented by a broadcaster 102 when the broadcaster receives a proof of bandwidth from a node, as discussed with respect to FIG. 3. At step 402 the broadcaster receives a proof of bandwidth from a node requesting compensation. The proof contains the self-reported bandwidth of the node digitally signed by the node and contains the bandwidth measured by the neighbor nodes with their respective digital signatures. At step 404 the broadcaster will use its local storage to verify if the node sending the proof is actually delivering a stream for broadcaster 102 and whether the list of neighbors listed in the proof is correct. At step 406 the broadcaster will then verify all the digital signatures and make sure none of the bandwidth values has been tampered with. In particular, the broadcaster will verify that the measurements coming from the neighbor nodes have actually been signed by them. At step 408 the broadcaster will then compare the self-reported bandwidth of the node with the sum of the bandwidth reported by the neighbors of the node. Moreover, it will calculate the maximum bandwidth of this node as number_of_neighbors X Ingest_stream_bandwidth. If the self-reported bandwidth and the sum of the bandwidth numbers provided by the neighbor nodes match up to a small δ and are smaller than the maximum bandwidth for that node, then the bandwidth is considered valid. At step 410, the broadcaster checks the reported packet loss and if the packet loss is also below a certain threshold, the broadcaster will send a transaction to compensate the node.

In accordance with an example embodiment, proxy nodes 106d can be compensated by origin nodes 106a for their operations. In particular, proxy nodes 106d can earn a fee for each new connection that they establish with an origin node 106a. Additionally, STUN servers only need to exchange a small amount of data and, so STUN servers are compensated by a stream broadcaster 102 with a onetime compensation per connection created. That is, the stream broadcaster 102 will compensate the STUN servers every time a new subscriber starts watching its stream and utilizes the STUN server. In contrast, TURN servers may be required to route the video stream between two nodes. This means that the resources that they provide to the network 100 are much bigger. TURN servers are compensated by a stream broadcaster 102 using the proof of bandwidth mechanism utilized with nodes 106, as discussed with respect to FIG. 3. This mechanism guarantees that the compensation is proportional to the bandwidth delivered by the TURN server. The different compensation mechanisms give an incentive to nodes to implement STUN and TURN capabilities. Additionally, even though backup nodes usually do not deliver the video to the subscribers 104 (discussed in greater detail with respect to co-pending U.S. application Ser. No. 15/954,473, incorporated herein by reference.) the backup nodes still need to be fairly compensated for the bandwidth used to deliver the stream between backup origins, backup relays, and backup edges. Thus, backup nodes can be compensated by a stream broadcaster 102 using the proof of bandwidth mechanism utilized with main nodes 106, as discussed with respect to FIG. 3.

Conversely, if nodes are identified as performing malicious and/or fraudulent behavior, the end users/nodes will be punished. For example, malicious nodes/users can be banned from future participation and/or will be penalized previously earned compensation (e.g., tokens). Additionally, a broadcaster 102 or subscriber 104 can be penalized if a node detects that a broadcaster or subscriber did not properly randomly select an origin node or edge node, respectively. For example, the verifiable random function (VRF) can be used to know if the broadcaster chose an origin node randomly, or if it cheated by selecting a node without using the VRF. If the present invention does not enforce random selection of nodes, it would be possible for nodes to pick other nodes that they control, and therefore control all the traffic and earn all the compensation for a stream.

A node may also be penalized if a node disconnects permanently without following the disconnection procedure (discussed in greater detail with respect to co-pending U.S. application Ser. No. 15/954,473, incorporated herein by reference). When a node improperly disconnects from the network while streaming, in an example embodiment, the nodes impacted by a node improperly disconnecting would detect the disconnection and immediately start using their backup node(s). At the same time, the effected nodes will message the broadcaster of the stream to notify that the node improperly left the stream. Upon receiving the notification, the broadcaster will check if that node was actually streaming and if all the nodes connected to it (e.g., neighboring nodes) reported the disconnection. The broadcaster can also check if a reference file (e.g., InterPlantery File System (IPFS), Swarm, etc.) with the timestamps of that node has been updated recently or not. If the reference file is not updated, each broadcaster would remove a portion of tokens from the disconnecting node. This procedure can involve having the node deposit a certain number of tokens every time it starts delivering a new stream. If the node follows all the procedures it can get back the deposit, otherwise the broadcaster will keep the deposit as punishment.

A node may also be penalized if a node or set of nodes reports a wrong bandwidth value for another node. In an example embodiment, in response to identifying a report of the wrong bandwidth, the honest node can disconnect from the bad node(s) that is reporting wrong measurements. Then, the honest node can add the malicious node to its own blacklist of bad nodes, which can be implemented as an IPFS file (or a file served via another storage system). If the bad node tries to connect again to it, the connection can be rejected. The malicious node may not be directly penalized, but if the node continues to report wrong bandwidth values it will be gradually isolated by the network. Thus, such a node won't be able to be selected again and to earn new compensation.

In another example embodiment, a node may be penalized if nodes try to collude with neighbor nodes to spoof the bandwidth and pretend they are delivering more bandwidth than they actually are. Because of how the present invention is implemented, for a node spoof bandwidth, the node needs the neighbor nodes to validate its bandwidth while the neighbor nodes will need that node (as it is one of their neighbors) to validate its bandwidth. This could create a general collusion and make the broadcaster pay much more than necessary. In an example embodiment, collusion is prevented by the broadcasters if the reported bandwidth value is higher than the maximum bandwidth of that node. A broadcaster knows the bandwidth of its stream that it is ingesting into the origin node. Thus, this ingested value cannot be higher for any other node, unless the node is cheating. The broadcaster knows also the number of neighbors of a node. Therefore, it can calculate the maximum bandwidth per node as follows:

$B_{max}$=#node neighbors*stream bandwidth

In this way, the broadcaster would reject all the proofs that claim bigger values than what is possible.

In another example, an attacker (e.g., edge node) can attempt to spoof bandwidth if the broadcaster is using variable bitrate (VBR) (discussed in greater detail with respect to co-pending U.S. application Ser. No. 15/954,473, incorporated herein by reference). With VBR, in an example embodiment, $B_{max}$ can be calculated using the maximum stream bandwidth. Therefore, an edge node could pretend that it is delivering the stream with the maximum bandwidth to all the subscribers connected to it while, in reality, it could be delivering the stream with the smallest bandwidth. The broadcaster would not be able to recognize this situation and the node would be paid more than it should. To reduce the chances of this situation happening, a node should be compensated only if it has at least three neighbors. This reduces considerably the probability of bandwidth spoofing. The broadcasters can enforce this rule and reference their local data to determine the number of neighbors of a node and compensate the node only if it has at least three neighbors. In another example, the broadcaster can validate the bandwidth by checking with subscribers to see what stream the subscriber has received from the edge node and determine if that value exceeds what is being reported by the edge node.

Tokens earned within the network 100 can be utilized and exchanged in similar manners as other cryptocurrencies or they can be utilized within the network 100. For example, users participating within the network 100 can use tokens to buy access to video streams (e.g., DRM keys) from their broadcasters (e.g., paid streams). In an example embodiment, the tokens can be tokens provided in accordance with a cryptocurrencies specification to be utilized over one or more blockchain specifications. For example, the tokens can be ERC20 tokens earned through the distributed smart contracts run on the Ethereum blockchain. The ERC20 tokens work within the Ethereum framework but, at the same time, provide flexibility in the design and function of the tokens. As would be appreciated by one skilled in the art, the tokens utilized within the system of the present invention can be specifically designed for the system and can be have a fixed allocation to control value. For example, a total of 500,000,000 tokens can be created and allocated as 15% in reserve, 10% to partnerships, 5% to advisors, 25% to team members, and 50% to token sales.

Figure 5:
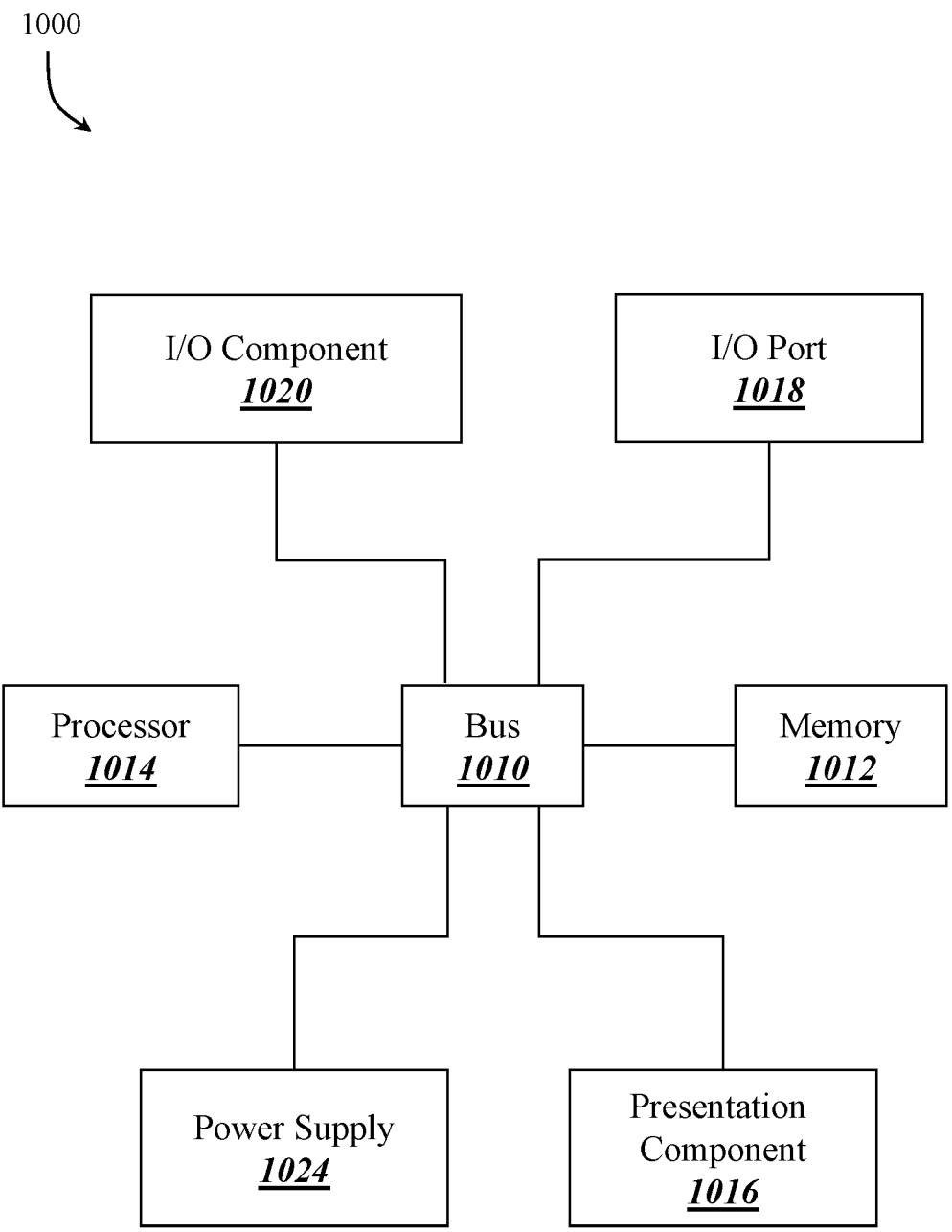
FIG. 5 is an exemplary computer architecture for use within a decentralized network, in accordance with the present invention.

FIG. 5 depicts an exemplary computer architecture for implementing the various aspects of the present invention. Any suitable computing device can be used to implement the computing devices (e.g., via the broadcaster 102, nodes 106, subscriber 104, etc.) and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 5. The computing device 1000 is merely an illustrative example of a suitable computing environment and in no way limits the scope of the present invention. A "computing device," as represented by FIG. 6, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 5 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for verifying reported bandwidth utilization from nodes participating in real-time streaming over a decentralized network, the method comprising:
   calculating, by a node, an amount of bandwidth used to deliver streaming data by the node to one or more neighboring nodes for a stream;
   requesting, by the node, a respective signed message from each of the one or more neighboring nodes receiving the stream, the respective signed message including a respective amount of streaming data received from the node by the neighboring node for the stream;
   receiving, by the node, respective signed messages from each of the one or more neighboring nodes receiving the stream, each signed message including a respective amount of streaming data received by the neighboring node from the node for the stream;
   transmitting, by the node, to a broadcaster node for the stream, the calculated amount of bandwidth and the respective signed messages received from the neighboring nodes for the stream; and
   whereby the broadcaster node verifies the calculated amount of bandwidth from the node based on the amount of streaming data reported as received by the neighboring nodes in the respective signed messages.

2. The method of claim 1, wherein the stream is a subscription fee based video stream.

3. The method of claim 1, wherein the node provides the stream between the broadcaster and at least one subscriber.

4. The method of claim 1, further comprising computing a compensation amount for a node proportional to the verified calculated amount of bandwidth provided by the node to deliver the stream.

5. The method of claim 4, wherein the node has a compensation price for bandwidth provided by the node to deliver the stream.

6. The method of claim 1, further comprising publishing a smart contract on a blockchain including a price of the stream, a start and end time of the stream, and geographical restrictions for the stream.

7. The method of claim 1, wherein the signed messages from the neighbor nodes include data indicative of packet loss experienced at the neighbor nodes with respect to the stream as received from the node.

8. A method for verifying proof of bandwidth for a node participating in real-time streaming over a decentralized network, the method comprising:
   receiving, by a broadcasting node and from a node, a calculated amount of bandwidth used by the node to deliver a stream to one or more neighboring nodes and respective signed messages from each of the one or more neighboring nodes having received the stream from the node, each signed message including bandwidth metrics including a respective amount of streaming data received by the neighboring node from the node for the stream;
   calculating a maximum bandwidth of the node by multiplying a number of the neighboring nodes by an ingest bandwidth of the stream; and
   comparing, by the broadcasting node, the calculated amount of bandwidth received from the node and the bandwidth metrics from the respective signed messages and the calculated maximum bandwidth to determine if the calculated bandwidth is valid.

9. The method of claim 8, wherein the comparing comprises comparing the calculated bandwidth used by the node to deliver the stream to a sum of the bandwidth metrics observed by the neighboring nodes during receiving the stream from the node.

10. A method for verifying proof of bandwidth for a node participating in real-time streaming over a decentralized network, the method comprising:
   receiving, by a broadcaster, a calculated bandwidth delivered by the node and a message signed by neighboring nodes, the message including bandwidth metrics for the node;
   calculating a maximum bandwidth of the node by multiplying a number of the neighboring nodes by an ingest bandwidth of the stream;
   comparing, by the broadcaster, the calculated bandwidth and the bandwidth metrics and the calculated maximum bandwidth; and
   transmitting, by the broadcaster, compensation to the node for the calculated bandwidth after the comparison is determined to be valid.

11. The method of claim 8, further comprises checking, by the broadcasting node, reported packet loss by the neighboring nodes.

12. The method of claim 11, further comprises determining whether the reported packet loss is below a threshold.

13. The method of claim 8, wherein the verifying the identities of the node and the neighboring nodes as participants within the stream comprises the broadcasting node checking the identities in local storage.

14. The method of claim 8, further comprises verifying, by the broadcasting node, identities of the node and the neighboring nodes as participants within the stream and signatures of the neighboring nodes in the message.

15. An apparatus providing real-time streaming over a decentralized network, comprising:
   a broadcaster node;
   a first node connected by a network to receive a stream from the broadcaster node;
   one or more neighboring nodes, each neighboring node connected by the network to receive the stream from the first node;
   the first node configured to:
      calculate an amount of bandwidth used by the node to deliver streaming data for to stream to the one or more neighboring nodes;
      request a signed message from each neighboring node receiving the stream, the signed message including a respective amount of streaming data for the stream received from the first node by the neighboring node;
      receive, in response to the request for the signed message, signed messages from the neighboring nodes, each signed message including the respective amount of the streaming data reported as received by the neighboring node;
      transmit, to the broadcaster node, the calculated amount of bandwidth and the signed messages including the respective amounts of streaming data received by the one or more neighboring nodes; and
      receive, from the broadcaster node, data representing compensation from an entity associated with the broadcaster node for the amount of the bandwidth used by the first node to deliver the stream as verified by the signed messages received from the one or more neighboring nodes.

16. A broadcasting node providing real-time streaming of streams of data over a decentralized network, comprising:
   a processing system comprising a processor, memory, and computer program instructions that, when processed by the processing system configure the broadcasting node to:
   receive, from a first node in the decentralized network, a message with data indicating a calculated amount of bandwidth used by the node to deliver a stream to one or more neighboring nodes in the decentralized network, and respective signed messages from each of the one or more neighboring nodes having received data for the stream from the first node, wherein each signed message includes bandwidth metrics including a respective amount of streaming data for the stream as received by the neighboring node from the first node;
   calculate a maximum bandwidth of the node by multiplying a number of the neighboring nodes by an ingest bandwidth of the stream; and
   compare the calculated amount of bandwidth received from the first node and the bandwidth metrics from the respective signed messages and the calculated maximum bandwidth to determine if the calculated bandwidth is valid.

17. The apparatus of claim 15, wherein the broadcasting node is configured to check reported packet loss by the neighboring nodes.

18. The apparatus of claim 17, wherein the broadcasting node is configured to determine whether the reported packet loss is below a threshold.

19. The broadcasting node of claim 16, wherein the broadcasting node is configured to check reported packet loss by the neighboring nodes.

20. The broadcasting node of claim 19, wherein the broadcasting node is configured to determine whether the reported packet loss is below a threshold.

* * * * *